Patented Apr. 3, 1951

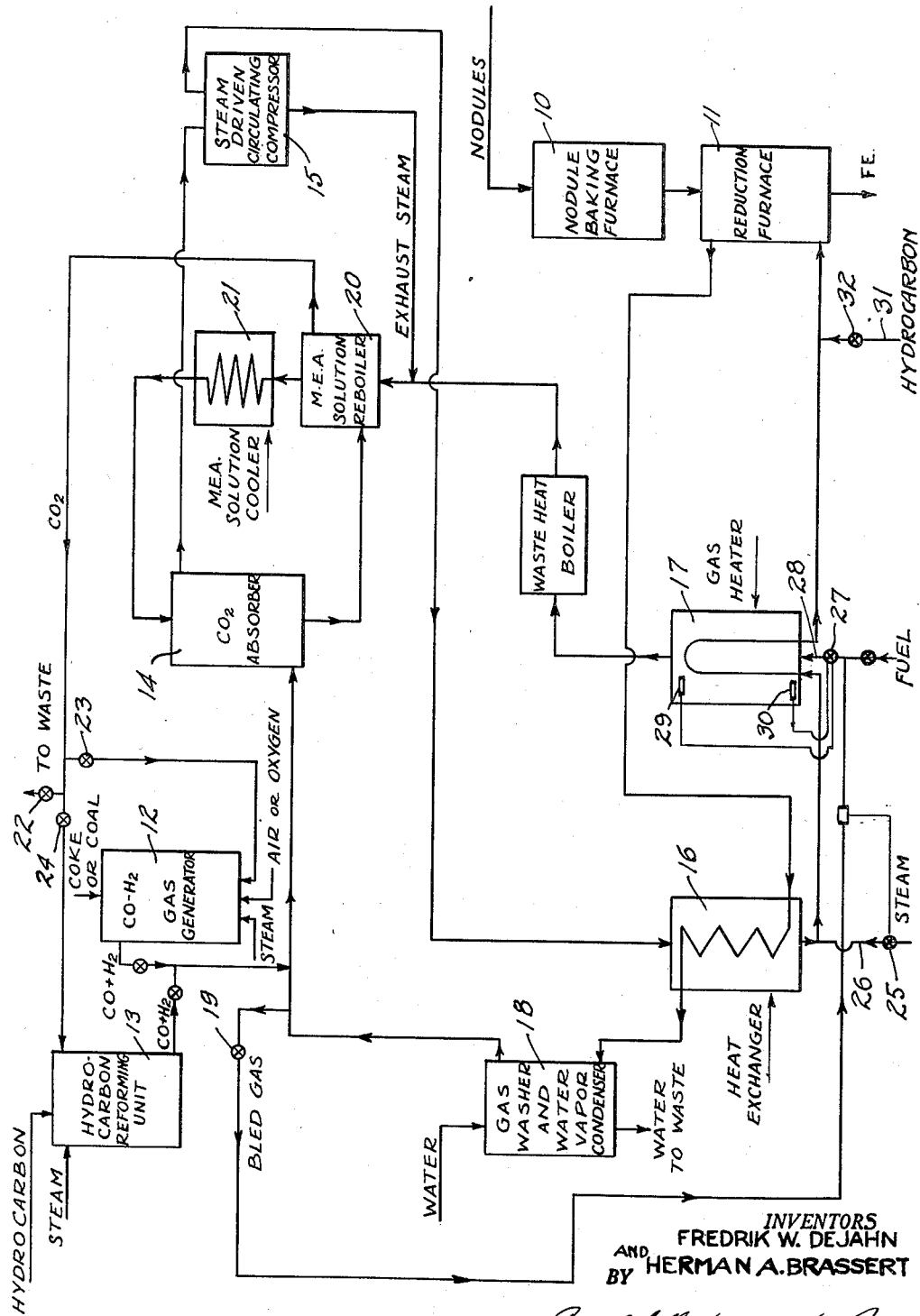

2,547,685

UNITED STATES PATENT OFFICE 2,547,685

REDUCTION OF METALLIC OXIDES

Herman A. Brassert, Washington, Conn., and Fredrik W. de Jahn, New York, N. Y., assignors to H. A. Brassert & Company, New York, N. Y., a corporation of Illinois Application November 25, 1947, Serial No. 788,034

2 Claims. (Cl. 75—34)

This invention relates to the production of iron and steel by direct reduction of iron oxides with a gaseous reductant comprising largely carbon monoxide, preferably admixed with hydrogen, and has particular reference to a method of controlling the carbon content of the reduced oxide while at the same time precluding sticking and fusing of the partially reduced oxide and other undesirable effects during the reducing operation.

It is well known that iron oxides, such as hematite, magnetite, limonite, roasted siderite, iron oxide derived from calcination of ferrous sulphate, mill or roll scale, and the like, may be directly reduced at temperatures below those at which their components soften or fuse, by means of a suitable reducing gas or mixture of gases such as those consisting largely of or containing mixtures of carbon monoxide and hydrogen. Where the reducing gas contains carbon monoxide, or hydrocarbons such as methane, which is the principal component of natural gas, carbon will be deposited on the iron oxide and iron and will partly combine chemically with the reduced iron as the reduction progresses.

If a low carbon melting stock is desired, then the hydrogen and carbon monoxide should be substantially free of hydrocarbons and the temperature should be kept in the higher ranges for reduction according to this invention, because the carbon deposition from carbon monoxide on reduced iron only occurs at lower temperatures, i. e., about 700° C. and below. If the melting stock high in carbon is desired, for instance, above 1% carbon, then a controlled amount of hydrocarbons can be added to the gas mixture and the reduction temperature kept as high as possible but below the point of softening, because the carbon deposition from hydrocarbons occurs at an increasing rate as the temperature increases, whereas carbon deposition from carbon monoxide occurs only in the lower temperature range, as stated. As used herein, the term "carbon content" in the product means the total carbon, both the free carbon and that combined as iron carbide or cementite, as in the customary terminology of pig iron.

Heretofore, it has not been possible to control the amount and rate of carbon deposition and as a result varying amounts of carbon were contained in the reduced iron made by direct reduction with gases containing carbon monoxide or hydrocarbons, or both. When the desired end product is to be pure powdered iron, such as is most commonly used at present for the pressing of finished parts, such as machine parts, even a small carbon content may be objectionable. When the desired end product is melting stock for open hearths and electric furnaces in the production of steel, a varying carbon content is also objectionable as it makes it impossible to properly compose the charge and the variation thus introduced requires additional time while extra ore or pig iron is added to the heat to bring it to the desired composition.

In accordance with the present invention, methods are provided for directly reducing metallic oxides, particularly iron oxide, at reducing temperatures but without fusion and by means of reducing gases, comprising largely carbon monoxide, preferably admixed with hydrogen, under such conditions that the reduced end product has a controlled carbon content varying from zero to any desired percentage up to 3%, or more. Under these conditions a melting stock may be made with the particular carbon content most suitable for the optimum technical and economic operation of open hearths and electric furnaces in any plant under existing local conditions, and the carbon content may be varied at will to suit any change in local conditions. For example, if the grades of steel produced, and other considerations, require an open hearth charge consisting of 80% steel scrap containing .15% carbon and 20% pig iron containing 4% carbon, the composite carbon content of the charge can be reproduced by using approximately only 60% steel scrap with 40% of the melting stock made according to this invention, with a carbon content of 2%, or by using solely a 100% melting stock charge containing .90% carbon made according to this invention.

The invention is preferably carried out by the use of a high percentage of carbon monoxide, for instance 70% to 80% carbon monoxide and 20% to 30% hydrogen, although different proportions of carbon monoxide may be employed. However, where the charge comprises nodules of the iron oxide, as is preferred, the use of carbon monoxide by itself has the objection that it causes the charge to swell and the nodules become highly friable. Moreover, pure carbon monoxide is difficult and expensive to produce, and mixtures of carbon monoxide and hydrogen as mentioned represent the cheapest form of reducing gas suitable for this process which can be produced, and the presence of the hydrogen appears to eliminate swelling and disintegration of the iron oxide charge, which makes the reducing operation difficult. Such mixtures of carbon monoxide and hydrogen can be made from any solid fuel, such as coal and coke, anthracite, lignite, peat char, charcoal, and the like. By the use of oxygen and steam, the production of such gas mixtures can be continuous, and in many cases more economical than when air and steam alternately are used, as in standard water gas practice for the gasification of these fuels. If the reducing mixture is made from oil or natural gas, these fuels may be reformed with steam over a catalyst instead of by the use of oxygen.

The carbon content of the product is controlled according to the invention by adding water vapor to the reducing gas mixture, thereafter regulating the amount of water vapor. The water vapor can be added to the gas mixture by bringing it in contact with water of the proper controlled temperature or by adding a measured amount of steam, preferably under automatic control. In this way, the carbon content in reduced iron can be held to as low as .1% and less, thus bringing it in line in respect to carbon content with the lowest carbon scrap obtainable for open hearth and electric furnace charging. On the other hand, carbon can be added to the iron by this method, so as to make the melting stock the equivalent of mixtures of steel scrap and pig iron, thereby replacing pig iron for that purpose.

Complete deoxidation of the iron oxide, such as may be required for iron powder, is generally not desirable for melting stock since the small amount of oxygen left in the melting stock improves its melting quality and accelerates the making of steel in open hearths and electric furnaces. If complete removal of oxygen is required, together with absence of carbon, as for instance in the production of pure iron for the powdered metal industry, this result can be obtained by the admission of pure hydrogen and a small amount of water vapor in the final stage of reduction. The pure hydrogen will complete the reduction and the water vapor will eliminate any carbon present. It may also be desirable to produce a completely reduced powder substantially free from oxygen but containing a certain controlled amount of carbon, which powder then would be equivalent to a steel powder and could be used for pressing steel parts or billets, slabs and sheet bar for subsequent rolling, forging or extruding, thus entirely circumventing the process of melting.

Since the effect of a given weight of water vapor per cubic foot of gas in the reduction zone depends to a certain extent on the temperature of the gas and more water vapor is required per cubic foot of gas with the rise in temperature to produce the same carbon removal, the control of the temperature is of prime importance. This temperature control according to the invention is carried out, first, by controlling the temperature of the incoming gas and water vapor mixture; second, by controlling the temperature of the baked nodules entering the reducing zone from the baking zone above.

For a better understanding of the present invention, reference may be had to the accompanying drawing, which comprises a typical flow sheet illustrating the procedural steps of the process according to the present invention.

If the iron oxide to be reduced is in the form of nodules, pellets or glomerules, produced according to Dean Patent No. 2,131,006, then we prefer to discharge such nodules while still hot from the baking process directly by gravity into the reducing zone through suitable gas seals to separate the oxidizing baking zone 10 from the reducing zone 11. If finely divided iron oxide is to be reduced directly without prior nodulizing and baking, then the reduction may be carried out by fluidization, as, for instance, according to the invention disclosed in Patents Nos. 2,316,664 and 2,389,133, issued jointly to applicant H. A. Brassert and others.

In carrying out the invention, the reducing operation is conducted in the presence of a mixture of carbon monoxide and hydrogen, and usually containing some nitrogen. The ratio of carbon monoxide to hydrogen is about one part of hydrogen to about three to four parts of carbon monoxide. Preferably, the gas contains from three and one-half to four times as much carbon monoxide as hydrogen, by volume, although an increase in hydrogen and a decrease in the carbon monoxide within the range specified does not produce appreciably different results in respect to the reduction of the oxides or the removal of oxygen. The mixture of gases may be generated either in a gas generator 12 similar to a water gas generator which may be fed with coke or coal. Steam and air or oxygen are blown through the glowing bed of coke, coal, or other carbonaceous matter to generate the gas.

If desired, the gas mixture may be made by reforming hydrocarbons, such as products from natural gas or refinery gases or hydrocarbons up to and including $C_4$ hydrocarbons in the generator 13. The gas generated in either the generators 12 or 13 is delivered to a carbon dioxide absorber 14 which may contain methanolamine solution (M. E. A.) for absorbing the carbon dioxide from the gas. The gas passing from the absorber consists essentially of hydrogen, carbon monoxide, nitrogen, and a relatively small amount of carbon dioxide. The gas is delivered to a steam driven compressor 15 which in turn supplies the gas to a heat exchanger 16 where the gases are heated before delivery into the reducing furnace 11. The partially heated reducing gas passing from the exchanger 16 is humidified at 26 by addition of water vapor in the form of steam and is passed through a gas heater 17 which raises the gas temperature to that required to maintain the temperature in the reduction zone in furnace 11 between about 750° C. and about 900° C. Thus, if the nodules enter the furnace 11 at 850° C. from the baking furnace 10, and it is desired to reduce the nodules at 850° C., the gas entering the furnace 11 need supply only sufficient additional heat to compensate for that lost in the endothermic reducing reaction.

The spent gas from the furnace 11, now consisting principally of hydrogen, carbon monoxide, steam, carbon dioxide and nitrogen, may be passed to the heat exchanger 16 to heat the incoming reducing gas and may be discharged to a gas washer and condenser 18 which is cooled by water. A part of the washed spent gas may be bled off through the valve 19 and returned to the heater 17 for combustion therein to heat the reducing gas supplied to the furnace. Another part of the spent gases from the washer 18 may be mixed with freshly generated gas from the generators 12 and 13 and returned therewith to the absorber 14.

The carbon dioxide absorbed in the absorber 14 may be recovered and reduced in either of the generators 12 and 13, by delivering the methanolamine solution to a reboiler 20 heated by waste steam from compressor 15 and a waste heat boiler which is heated by the combustion gases from the heater 17. The carbon dioxide is driven off in the reboiler 20 and the methanolamine is cooled in the cooler 21 and returned to the absorber 14 for use therein.

Only about half of the carbon dioxide from the reboiler 20 is used in the generator 12, inasmuch as two volumes of carbon monoxide are produced from one volume of carbon dioxide therein, the remainder being bled off to atmosphere through the valve 22. All of the carbon dioxide may be supplied to the generator 13 for in this apparatus one volume of carbon monoxide is produced for each volume of carbon dioxide supplied thereto. The valves 23 and 24 are utilized to control the supply of carbon dioxide to the gas generators 12 and 13.

We have found that a substantially dry reducing gas consisting of about equal parts of carbon monoxide and hydrogen, containing less than .002 pound of water vapor per cubic foot and being free from hydrocarbons, will give a reduced iron oxide containing about one-half per cent carbon. On the other hand, if this same gas contains water vapor in the order of .006 pound per cubic foot the resulting reduced iron oxide will contain less than .1% carbon. We have also found that by varying the weight of water vapor in the gas mixture between about .002 and about .01 pound per cubic foot of gas, i. e., that amount of water vapor which saturates the gas between about 30° C. and about 70° C., and then utilizing a given reduction temperature within a comparatively narrow range, a very marked change in the carbon content of the reduced material can be obtained. For instance, nodules made from New Jersey magnetite concentrate and containing about 72% Fe and .2% S¹O₂ were reduced with water gas containing 46% CO and 50% hydrogen, the gas being substantially dry, containing less than .0005 pound water vapor per cubic foot. At a temperature in the reduction zone of 850° C. the product contained .44% carbon. Repeating the reduction in exactly the same way, with the same gas flow, same water gas analysis, same temperature and the same iron ox'de, but saturating the gas with water vapor at about 50° C. equivalent to about .006 pound of water vapor per cubic foot, the carbon content of the product was reduced to .06%.

In some cases, for example, when the product is melting stock to be used as a substitute for steel scrap or pig iron in the smelting operation of open hearth and electric furnaces, a definite amount of carbon is highly desirable. By automatically regulating the water vapor content of the gas and the temperature in the reducing furnace, it is possible to provide the desired and necessary carbon content in the furnace charge. Water regulation is preferably automatic and may be effected by a conventional automatic flow control apparatus 25 in steam supply pipe 26 and responsive to the water vapor content in the reducing gas mixture as supplied to the furnace 11. Similarly, the temperature in reducing furnace 11 may be accurately regulated by controlling the supply of fuel by a valve 27 in the combustion fuel line 28 responsive to the average temperature in the gas heater 17 as determined by pyrometers or thermostats 29 and 30 therein.

When a melting stock having a carbon content greater than 1% is desired, say up to 2% or more, a suitable hydrocarbon, such as methane, propane, or the like, may be added at 31, and the volume thereof controlled by valve 32, either manually or automatically, to control the carbon content of the reducing gas. By thus controlling the carbon content of the reduced oxides, melting stock having virtually any desirable characteristics may be provided for the manuafacture of iron and steel products.

If the reduced material is discharged from the reducing furnace in relatively finely-divided form, whether partially or more completely reduced, it may be briquetted under a reducing atmosphere and while still hot, with or without admixture of alloying metals, as described in Patent No. 2,287,663, issued June 23, 1942, to applicant Brassert. Also, if the output of reducing furnace 11 is reduced nodules, they may be similarly treated to provide the desired melting stock formula.

In a typical operation involving charging the reduction furnace at the rate of 100 pounds iron oxide nodules per hour, gas from a standard water gas set containing 30 per cent carbon monoxide, 45 per cent hydrogen, 2 per cent carbon dioxide and 23 per cent nitrogen was used and was then saturated with water vapor at from 40 to 42° C., making a water vapor content of .0035 pound per cubic foot. No hydrocarbons were present. On leaving the reduction furnace, the off gas contained 21 per cent carbon monoxide, 39 per cent hydrogen, 15.4 per cent carbon d'oxide, and 24.6 per cent nitrogen. In this case, the consumption of carbon monoxide was higher than the consumption of hydrogen, that is, the utilization of the carbon monoxide in the gas was higher than the utilization of the hydrogen in the gas. This is quite different from when dry gas is used. Then, the utilization of the hydrogen is higher than the utilization of carbon monoxide. The resulting product with a total weight of 3500 pounds contained an average of .17% carbon.

The best results were obtained at temperatures as near 900° C. as possible. Temperatures between about 825° and 875° are preferable for the reason that the rate of reduction at these temperatures is high, and fusing or sticking of the nodules is largely eliminated. Moreover, the steel alloys used in the reduction chamber are not softened or weakened at temperatures of this order, and there is no substantial swelling of the nodules, as may occur at higher temperatures.

The advantages of the use of water vapor in the reducing gas are best shown by the following tests:

A dry gas consisting of 60 per cent hydrogen and 40 per cent carbon monoxide was used to reduce nodules of iron oxide at a temperature of 800° C. The resulting product contained 1.96 per cent carbon and reduction was only 90 per cent complete.

Similar tests were conducted with reducing gas which had been bubbled through water at 30° C. and then used for reducing nodules of the same iron oxide at 800° C.

The compositions of the reducing gases were:

| | CO | H₂ |
|---|---|---|
| | Per cent | Per cent |
| 1 | 80 | 20 |
| 2 | 60 | 40 |
| 3 | 40 | 60 |

The following deoxidations and carbon contents were obtained:

|   | Deoxidation | Carbon Content |
|---|---|---|
|   | Per cent | Per cent |
| 1 | 94.3 | .66 |
| 2 | 93.75 | .66 |
| 3 | 95.45 | .42 |

In addition to showing that the addition of water vapor improves the efficiency of the reducing gas, these tests indicate that gases in which carbon monoxide is present in greater proportion than hydrogen are about as satisfactory as those containing a higher proportion of hydrogen. The use of a higher percentage of carbon monoxide in the gas mixture has the advantage of reducing the heat needed for the reduction. This is explained by the fact that the heat needed when using pure hydrogen is approximately 814,000 B. t. u. per ton of iron and that the heat "generated" when using carbon monoxide is approximately 140,000 B. t. u. per ton of iron.

From the preceding description, it will be apparent that the use of controlled amounts of water vapor in mixtures consisting principally of hydrogen and carbon monoxide greatly benefits the reducing operation and results in a more completely reduced and purer form of product. This product is suitable for use to replace scrap iron or steel, and, if it is desired to produce powdered iron therefrom, it can be treated efficiently with hydrogen to complete the reduction of the small percentage of oxide remaining therein. It will be understood that the proportions of the carbon monoxide and hydrogen may be varied suitably and that these gases can be obtained from any available source. Therefore, the embodiment of the invention described herein should be considered as illustrative and not as limiting the scope of the following claims.

We claim:

1. A method of reducing iron oxides which comprises bringing iron oxide heated to between about 750° C. and about 900° C. into contact with a heated reducing gas consisting essentially of carbon monoxide and hydrogen in the ratio of about three to about four parts by volume of carbon monoxide to each part of hydrogen by volume, introducing water vapor into said gas to maintain the water content of the gas within a range between about .002 and about .01 pound of water vapor per cubic foot of gas and increasing the water vapor content, within said range, to decrease the carbon content of the reduced oxide, and decreasing the water vapor content, within said range, to increase the carbon content of said reduced oxide.

2. A method of reducing iron oxide, which comprises treating the oxide in a reducing zone at between about 750° C. and about 900° C. with a reducing gas consisting essentially of hydrogen and a carbon-containing gas, said carbon-containing gas being capable of being cracked at said temperatures in the presence of said iron oxide to deposit carbon thereon, said carbon-containing gas being present in a ratio of about ⅔ part to 4 parts by volume to one part of hydrogen, introducing water vapor into said reducing gas to maintain a water vapor content in the gas within a range between about .002 and about .01 pound of water vapor per cubic foot of gas, said water vapor content being increased, within said range, to reduce the carbon content of the reduced oxide and decreased, within said range, to increase the carbon content of the reduced oxide.

HERMAN A. BRASSERT.
FREDRIK W. DE JAHN.

REFERENCES CITED

The following references are of record in the file of this patent:

UNITED STATES PATENTS

| Number | Name | Date |
|---|---|---|
| 1,256,623 | Westberg et al. | Feb. 19, 1918 |
| 1,310,724 | Westberg | July 22, 1919 |
| 1,758,786 | Ekelund | May 13, 1930 |
| 2,048,112 | Gahl | July 21, 1936 |
| 2,131,006 | Dean | Sept. 30, 1938 |
| 2,166,207 | Clark | July 18, 1939 |
| 2,287,651 | Turin | June 23, 1942 |
| 2,368,489 | Patterson | Jan. 30, 1945 |
| 2,329,862 | Terry et al. | Sept. 21, 1943 |

OTHER REFERENCES

"Sponge Iron Low in Impurities by Ekelund's Process", Metal Progress vol. 20 No. 4, October 1931, pages 89 and 90.

"Pilot-Plant Investigations, Production of Sponge Iron," U. S. Bureau of Mines Report of Investigations 3994 (December 1946).

"Controlled Atmospheres for the Heat Treatment of Metals" by Ivor Jenkins, published 1946, pages 212, 213 and 280–285.